July 11, 1933.  J. NEWMANN  1,917,772
RADIAL MOTOR
Original Filed Aug. 16, 1928   2 Sheets-Sheet 1
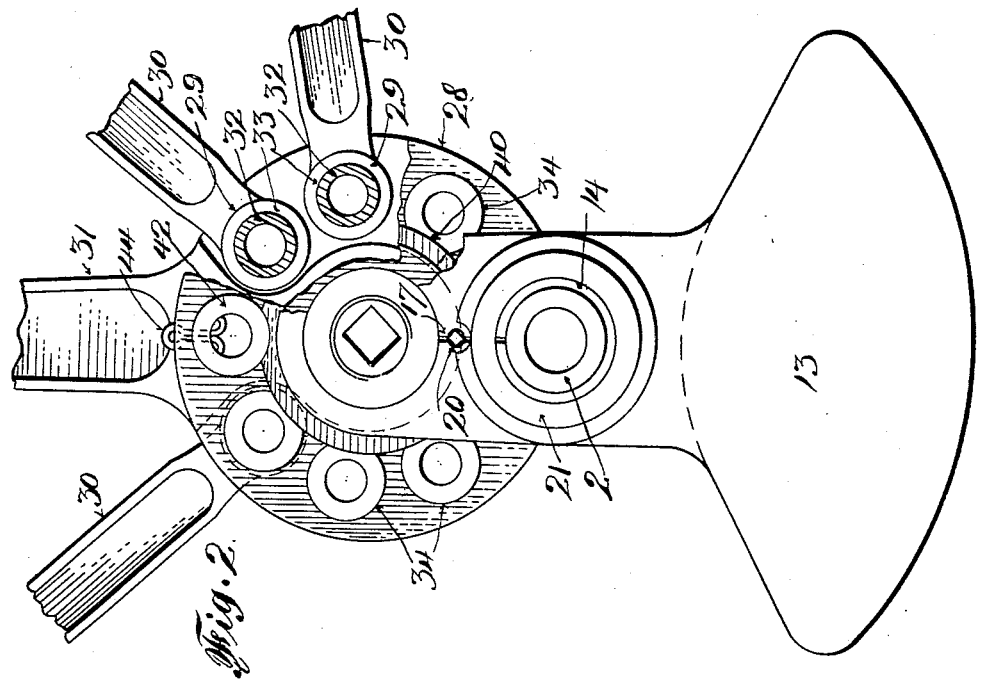
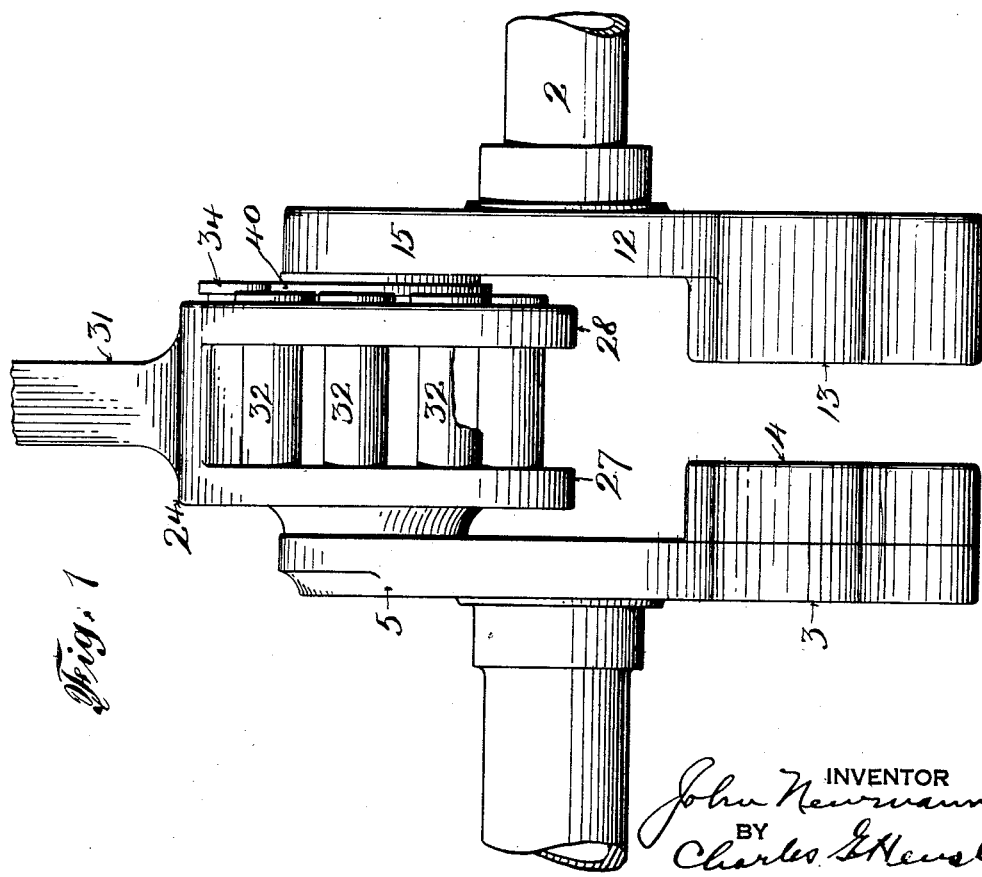
INVENTOR
John Newmann
BY
Charles G Hensley
ATTORNEY July 11, 1933.  J. NEWMANN  1,917,772
RADIAL MOTOR
Original Filed Aug. 16, 1928   2 Sheets-Sheet 2
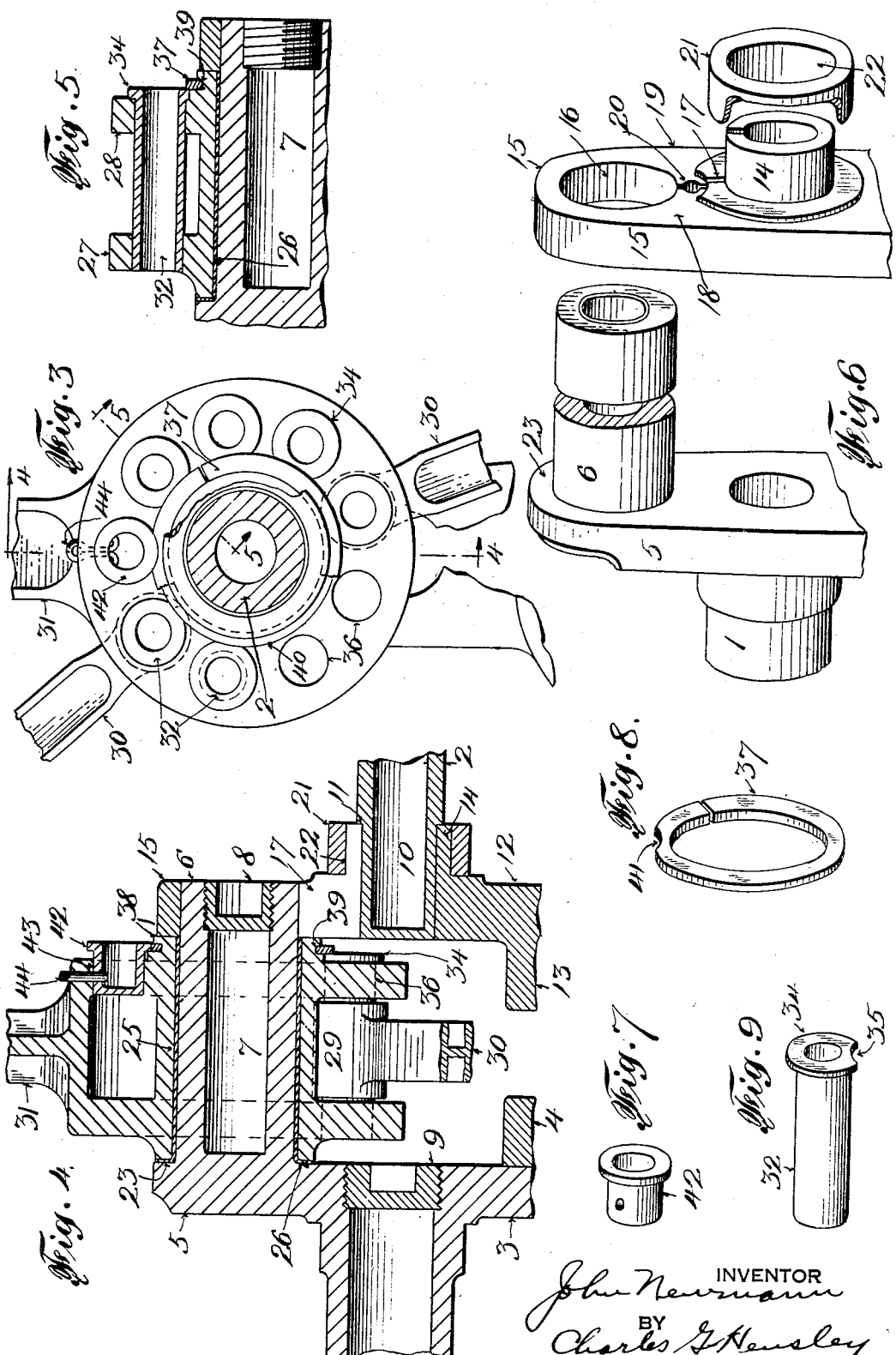

Patented July 11, 1933

1,917,772

UNITED STATES PATENT OFFICE

JOHN NEWMANN, OF BROOKLYN, NEW YORK; CHARLES G. HENSLEY, RECEIVER, OF NEW YORK, N. Y.

RADIAL MOTOR

Refiled for abandoned application Serial No. 299,943, filed August 16, 1928. This application filed July 17, 1931. Serial No. 551,427.

The present application is a refile of abandoned application Serial No. 299,943, which was filed August 16, 1928.

My invention relates to radial motors and while it is especially adapted for motors to be used on aeroplanes, the invention is also adapted to be used with motors for other purposes. The invention relates to that type of radial motor wherein an annular connecting member is integral with, or connected to a master piston rod and wherein a plurality of connecting rods are pivotally connected with the annular member, so that a number of cylinders may be arranged around a common axis and have their several rods operating on a common crank. A motor of this type is shown in my Patent No. 1,572,672, and an improved type is shown in my co-pending application Serial No. 256,146, now Patent No. 1,823,464.

One of the principal objects of the present invention is to provide a radial motor of the type above referred to wherein the number of parts will be reduced to a minimum, both for the purpose of simplicity and to reduce the total weight. Each pound of weight eliminated in the revolving parts of the crank is not only a direct saving in weight, but it reduces the amount of counterbalance necessary to cause the device to operate smoothly; in other words, making the revolving parts lighter by reducing the parts and their weight results in a double saving by reason of the reduction in the weight of the counterbalance. In the present device I have reduced the weight of the parts to a minimum and I have simplified them so that the assembling and disassembling may be done expeditiously and without special tools.

Another object of my invention is to eliminate the use of screws, bolts and nuts in order that there may be no parts which can become disassembled or loosened by reason of vibration or from the ordinary operation of the parts. The present invention, like the one shown in my said co-pending application, employs a plurality of connecting rods disposed radially about the crank shaft, which are all connected with the annular bearing member which operates on a single crank to drive a shaft.

Each connecting rod, except for the master rod, is connected by a knuckle pin with the annular member and the several knuckle pins are held in assembled relation by a preferably split ring which may be quickly assembled and disassembled or which may be turned in order to permit the removal of any individual knuckle pin. Other advantages and improvements will be set forth in the detailed description of my invention hereinafter.

In the drawings forming part of this application,

Figure 1 is an elevation of part of the shaft crank and crank assembly embodying my invention, Figure 2 is an end elevation thereof with parts broken away to show the interior, Figure 3 is a sectional view showing the parts in assembled position but with some of the connecting rods omitted, Figure 4 is a sectional view taken on the line 4—4 of Figure 3, Figure 5 is a sectional view taken on the line 5—5 of Figure 3, Figure 6 is a perspective view of a portion of the shaft and crank, Figure 7 is a perspective view of a cap for retaining the split ring in position, Figure 8 is a perspective view of the split ring, and Figure 9 is a perspective view of one of the knuckle pins.

In the drawings I have shown two sections, 1, 2 of the engine shaft which are in axial alignment and which carry the members of the crank. The section 1, for instance, is provided with a lateral arm 3 on one end of which is mounted the counterweight 4 for partially counterbalancing the crank pin and associated parts. The arm 5 extending in the opposite direction has formed upon it and preferably integral therewith a laterally extending wrist pin 6 which, for lightness, is preferably made hollow by having a bore 7 therein which is closed at one end by the screw plug 8 to prevent the accumulation of dirt in the bore. For similar purposes I prefer to provide a screw plug 9 fitting into the shaft member 1.

The shaft section 2 is shown as hollow although it may be made solid if desired and it is provided with a reduced end 10 to form a shoulder or abutment 11 against which the crank member 12 is adapted to seat. This member consists of the arm 12 which is here shown as provided with an integral counterweight 13 which serves a similar purpose to the counterweight 4. This arm 12 is provided with a laterally extending hub or boss 14 adapted to fit snugly over the reduced end 10 of the shaft section 2. The arm 15 which extends opposite to the arm 12 is provided with an aperture 16 to receive, by tight fit, the free end of the wrist pin 6. It will be observed that there is a split or cut 17 extending from the aperture 16 through a portion of the arm 15 and through one side of the boss 14 so that the portions 18, 19 of the arm on opposite sides of this cut may be sprung or forced when the arm 15 is being fitted to the end of the wrist pin 6.

Preferably, there is a tapered aperture 20 extending into the arm 15 in the line of the cut or slot 17 into which opening a tapered pin may be driven for the purpose of releasing the hold of the arm 15 upon the wrist pin when the parts are being disassembled. There is a cap 21 shown in Figure 6 which is adapted to be driven over the end of the boss 14 when the latter is in place on the reduced end 10 of the shaft section 2 and the internal bore 22 of this cap is preferably slightly tapered so that as the cap is driven onto the boss it will cause the portions 18, 19 of the arm on opposite sides of the slot 17 to be drawn slightly toward each other to tighten the arm upon the shaft section 2 and to also tighten it on the end of the wrist pin 6.

The arm 5 forms a shoulder 23 and the arm 15 forms a shoulder near the opposite end of this wrist pin, so that between the two the annular bearing member 24 is adapted to be confined. This member 24, which is of annular shape, has a bore 25 to receive the wrist pin 6 therein. In the form of the invention shown in the drawings, the inner surface or bore of the annular member 24 is bushed or babbitted with lining 26 to form the bushing or babbitt which takes the wear in place of the annular member. This babbitt member is, preferably, applied by heat and pressure by any well known process, so that it becomes a fixed part of the annular member. When this lining becomes worn it may be renewed or replaced according to well known practice.

The annular member 24 is provided with flanges 27, 28 which are spaced apart sufficiently to receive the heads 29 of the radially disposed connecting rods 30 each of which is connected with a piston of the engine (not shown).

In the drawings I have shown a construction adapted for a radial motor having nine cylinders and nine pistons, although the number may be varied as may be desired. One of these piston rods, here shown as the rod 31, is the master connecting rod and is preferably formed integral with the annular bearing member 24, so that the latter will not revolve in relation to the integral connecting rod, whereas the remaining connecting rods of the group are pivotally connected with the annular bearing member in the following manner:

There is a knuckle pin 32 for each of the pivoted connecting rods, each consisting of a cylindrical portion adapted to fit one of the bores 33 of the head 29 on the pivoted connecting rods 30. In additon, each pin has a lateral flange 34 at one end, which is shown as circular, with an arcuate cutout or notch 35. These pins are passed through the bores 36 of the parallel flanges 27, 28 of the annular bearing member, the flange 34 of each pin preventing the pin from moving lengthwise out of position in one direction.

To prevent the pins from moving out of position in the opposite direction, I have provided a split ring 37, as shown in Figure 8, which is adapted to be sprung sufficiently to be passed over the portion 38 of the annular bearing member until the ring registers with the annular groove 39 in the annular bearing member, whereupon the split ring contracts and fits snugly into this annular groove. This split ring is adapted to engage the outer surfaces of the several flanges 34 of the knuckle pins 32 in order to prevent these pins from moving longitudinally in one direction. The notches 35 in the flanges of the pins are adapted to fit the shoulder 40 on the bearing member 24 so that when the pins are in position they are prevented from revolving.

The split ring 37 is provided with a notch 41 in its outer edge, which notch may be brought into register with any flange 34 in any one of the several pins 32 by turning the split ring around in its groove 39. When the split ring is moved, so that its notch 41 registers with one of the flanges 34 the particular pin 32 with which the split ring registers may be withdrawn endwise from the flanges 27, 28 of the annular bearing member in order to disassemble one of the connecting rods from the annular bearing member without having to disassemble any of the remaining connecting rods.

When the split ring is in operative position, as shown in Figure 3, it is adapted to be held from revolving by means of a plug 42 which is inserted into a bore 43 in line with the master connecting rod 31 and the plug may be held in place by means of a cotter pin 44 passing through a portion of the annular bearing member and through the wall of the hollow plug, the ends being turned over to secure the cotter pin in place.

It will be observed that I have eliminated all bolts and screws and thereby avoid the dangers incident to the use of threaded members which are likely to become loosened when the motor is in operation. In addition, the weight of such bolts and screws is eliminated. The present construction also permits the quick removal and replacement of any of the knuckle pins or connecting rods without special tools, so that repairs and replacements may be effected quickly. This is of importance in aeroplane practice because an aviator may carry spare parts and effect the necessary replacements even though he is out of reach of shop equipment.

In assembling the device the annular bearing member 24 is slid over the free end of the wrist pin 6 until it abuts against the shoulder 23 and, of course, in this operation the fixed connecting rod 31 is also assembled as it is a part of the annular bearing member. The crank arm 12, 15 is then forced onto the free end of the wrist pin, the latter being received in the aperture 16. The shaft section 2 is then forced into the bore of the hub 14 and for both of these assembling operations a slight spring of the metal is permitted by reason of the slot 17 so that the sections 18, 19 of the arm may spring slightly while the wrist pin is being received in the aperture 16 and while the reduced end 10 of the shaft section 2 is being received into the hub 14.

To assist the assembly, a tapered pin may be temporarily driven into the aperture 20 to expand the portions 18, 19 of the crank arm slightly, after which the pin is removed to allow these parts to contract or spring back into the normal position in which the wrist pin will be tightly gripped within the aperture 16 and the reduced end 10 of the shaft will be tightly gripped in the hub 14. Before the crank arm 12, 15 is applied to the shaft section 2 the ring 21 is slipped over the end of this shaft section and when the crank arm has been assembled in the manner described and the tapered pin has been withdrawn from the aperture 20 the ring 21 is driven over the hub 14 and tightens the hub 14 upon the shaft end 10 and it also serves to tighten the crank arm on the end of the wrist pin 6.

From this it will be apparent that the crank and shaft may be assembled without the use of bolts or threaded members and the parts are made lighter in construction at the same time being stronger than with devices heretofore used.

Whenever it is desired to remove one of the pins 32 or one of the pivotal connecting rods, the cotter pin 44 is withdrawn from the plug 42 and the plug is removed from the aperture 43. The split ring 37 may then be turned around in the groove 39 until its notch 41 registers with the flange 34 of whichever knuckle pin is to be disassembled, whereupon that particular pin may be withdrawn endwise from the bores 36 in the flanges 27, 28 and a new pin may be put in its place, and at the same time a new connecting rod may be inserted, if necessary.

After the replacement has been accomplished, the split ring is moved back into the position shown in Figure 3 and the plug 42 is reinserted to engage in the notch 41 of the split ring and the cotter pin 44 is replaced. During the operation of the motor, therefore, the split ring cannot revolve in its groove 39 and it serves to hold all of the pins 32 in assembled condition. It will be apparent that by using this split ring to hold all of the pins in position, that it is unnecessary to bore and tap holes in the annular bearing member between the bores 36 as in previous devices. This permits the annular bearing member to be made smaller, lighter and stronger than in previous constructions.

Modifications may be made without departing from the spirit and scope of my invention as set forth in the claims. For instance, it is not imperative that the bushing is attached to the annular bearing member although by following this practice the bushing may be made smaller and lighter and it is the preferred construction.

Having described my invention, what I claim is:

1. In a crank construction for radial motors the combination of a shaft having a crank including a wrist pin, an annular bearing member revolvably mounted upon said wrist pin and having spaced lateral flanges provided with knuckle pin apertures, a plurality of connecting rods having heads disposed between said flanges, knuckle pins passing through the knuckle pin apertures in said flanges and the heads of said connecting rods to pivotally connect said rods with said flanges, said knuckle pins having lateral flanges on one end thereof and a detachable ring mounted on said annular bearing member and engaging the said lateral flanges to hold the knuckle pins in assembled position in said first mentioned flanges.

2. In a crank construction for radial motors the combination of a shaft having a crank, including a wrist pin, an annular bearing member revolvably mounted on said wrist pin and having spaced lateral flanges provided with knuckle pin apertures, said bearing member having a circumferential groove formed directly therein, said bearing member having locking shoulders at opposite sides of said groove, a plurality of connecting rods having heads disposed between said flanges, knuckle pins passing through the knuckle pin apertures of said flanges and the heads of said connecting rods to pivotally connect said rods with said flanges, and a detachable ring engaging in said annular groove and lying between said locking shoulders of said bearing member and adapted to hold said pins from axial movement in at least one direction in said flanges.

3. In a crank construction for radial motors the combination of a shaft having a crank including a wrist pin, an annular bearing member revolvably mounted on said wrist pin and having spaced lateral flanges provided with knuckle pin apertures, said annular bearing member having an annular groove formed directly therein, said bearing member having a locking shoulder adjacent said grooves, a plurality of connecting rods having heads disposed between said flanges, knuckle pins passing through the knuckle pin apertures in said flanges and the heads of said connecting rods to pivotally connect the latter with said flanges, a detachable split ring engaging in said annular groove of said bearing member and held therein by said locking shoulder and adapted to be sprung out of said groove and adapted to hold said knuckle pins from axial movement in at least one direction in said flanges.

4. In a crank construction for radial motors the combination of a shaft having a crank including a wrist pin, an annular bearing member revolvably mounted on said wrist pin and having spaced lateral flanges provided with knuckle pin apertures, said annular bearing member having an annular groove, a plurality of connecting rods having heads disposed between said flanges, knuckle pins passing through the knuckle pin apertures in said flanges and the heads of said connecting rods to pivotally connect the latter with said flanges, said pins having lateral flanges on one end thereof, and a detachable split ring engaging in said annular groove and engaging the flanges of said pins to hold said pins in assembled position in said flanges.

5. In a crank construction for radial motors the combination of a shaft having a crank including a wrist pin, an annular bearing member revolvably mounted on said wrist pin and having spaced lateral flanges provided with knuckle pin apertures, a plurality of connecting rods having heads disposed between said flanges, knuckle pins passing through the apertures in said flanges and the heads of said connecting rods to pivotally connect said rods with said flanges, said pins having lateral flanges on one end thereof, said flanges having notches, said annular bearing member having an abutment for engaging in said notches to prevent said knuckle pins from revolving in relation to the bearing member, and a detachable ring on said annular bearing member arranged to hold said knuckle pins in assembled position in said flanges.

6. In a crank construction for radial motors the combination of a shaft having a crank including a wrist pin, an annular bearing member revolvably mounted on said wrist pin, said bearing member having spaced lateral flanges provided with knuckle pin apertures, said bearing member having an annular groove formed directly therein, a plurality of connecting rods having heads disposed between said flanges, knuckle pins each having a flange, said pins passing through said knuckle pin apertures in said first flanges and the heads of said connecting rods to pivotally connect said rods to said first flanges, a detachable split ring engaging in said groove of the bearing member and arranged to hold said pins against axial movement in at least one direction and adapted to be sprung out of said groove in said flanges, said split ring being revolvable in said groove and having a notch adapted to be registered with the several pins to permit individual pins to be withdrawn from said annular bearing member.

7. In a crank construction for radial motors the combination of a shaft having a crank including a wrist pin, an annular bearing member revolvably mounted on said wrist pin and having spaced lateral flanges provided with knuckle pin apertures, said bearing member having an annular groove formed directly therein, said bearing member having a locking shoulder adjacent said groove, a plurality of connecting rods having heads disposed between said flanges, knuckle pins having flanges, said pins passing through said knuckle pin apertures in said flanges and the heads of said connecting rods to pivotally connect said rods to said first flanges, a detachable split ring engaging in said groove of the bearing member and locked therein by said shoulder and adapted to be sprung out of said groove and adapted to hold said knuckle pins in assembled position in said flanges, said split ring being revolvable in said grooves and having a notch adapted to be registered with the several knuckle pins to permit individual pins to be withdrawn from said first flanges, and a plug in said bearing member and adapted to engage in the notch of said split ring to prevent the turning of said split ring in relation to the bearing member.

8. In a crank construction for radial motors the combination of a shaft having a crank including a wrist pin, an annular bearing member mounted on said wrist pin and having lateral flanges provided with knuckle pin apertures, said bearing member having an annular groove formed directly therein, said bearing member having a locking shoulder at the side of said groove, a plurality of connecting rods having heads disposed between said flanges, knuckle pins passing through the knuckle pin apertures in said flanges and the heads of said connecting rods to pivotally connect the said rods with said flanges, said knuckle pins having lateral flanges on one end thereof provided with a notch adapted to be engaged by a portion of said annular bearing member to prevent the turning of the knuckle pins in relation to the bearing member, and a detachable split ring fitting in said annular groove and locked therein by said locking shoulder and adapted to be sprung out of said groove and adapted to engage the outer face of the flanges of said knuckle pins to hold said knuckle pins in assembled position.

9. In a crank construction for radial motors the combination of a shaft including crank arms and a wrist pin between the crank arms, said crank arms forming lateral abutments, an annular bearing member revolvably mounted on said wrist pin between said lateral abutments, said annular bearing member having spaced lateral flanges provided with knuckle pin apertures, a plurality of connecting rods having heads disposed between said flanges, knuckle pins passing through said knuckle pin apertures in said flanges and the heads of said piston rods to pivotally connect said rods with said flanges, said bearing member having an annular groove formed directly therein, said bearing member having a locking shoulder adjacent said groove and a detachable ring mounted in said groove and locked by said shoulder, said ring engaging said knuckle pins to hold them against axial movement in at least one direction in said flanges, said ring being adapted to be sprung out of said groove of the bearing member.

Signed at the city, county and State of New York, this 24th day of June, 1931.

JOHN NEWMANN.